United States Patent
Ye et al.

(10) Patent No.: US 12,245,223 B2
(45) Date of Patent: Mar. 4, 2025

(54) SIDELINK PHYSICAL LAYER PRIORITY BASED PROCEDURES

(71) Applicant: Apple Inc., Cupertino, CA (US)

(72) Inventors: Chunxuan Ye, San Diego, CA (US); Chunhai Yao, Beijing (CN); Dawei Zhang, Cupertino, CA (US); Haitong Sun, Cupertino, CA (US); Hong He, Cupertino, CA (US); Jia Tang, Cupertino, CA (US); Jie Cui, Cupertino, CA (US); Oghenekome Oteri, Cupertino, CA (US); Sigen Ye, Cupertino, CA (US); Wei Zeng, Cupertino, CA (US); Weidong Yang, Cupertino, CA (US); Yang Tang, Cupertino, CA (US); Yushu Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 17/598,222

(22) PCT Filed: May 14, 2020

(86) PCT No.: PCT/CN2020/090183
§ 371 (c)(1),
(2) Date: Sep. 24, 2021

(87) PCT Pub. No.: WO2021/226915
PCT Pub. Date: Nov. 18, 2021

(65) Prior Publication Data
US 2023/0059550 A1    Feb. 23, 2023

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/21* (2023.01); *H04W 72/569* (2023.01)

(58) Field of Classification Search
CPC ............. H04W 72/1268; H04W 72/21; H04W 72/569; H04W 4/46; H04W 88/04;
(Continued)

(56) References Cited

U.S. PATENT DOCUMENTS

2020/0146082 A1    5/2020  Chen et al.
2021/0014831 A1*   1/2021  Ryu .................. H04W 72/02
(Continued)

FOREIGN PATENT DOCUMENTS

CN        110912653 A     3/2020
CN        111034320 A     4/2020
(Continued)

OTHER PUBLICATIONS

APPLE: "On Remaining Details of Mode 1 Resource Allocation", 3GPP Draft; R1-2002324, 3rd Generation Partnership Project (3GPP), Mobile Competence Centre; vol. RAN WG1, No. e-Meeting; Apr. 20, 2020-Apr. 30, 2020 Apr. 11, 2020, XP051875544.
(Continued)

*Primary Examiner* — Rownak Islam
(74) *Attorney, Agent, or Firm* — Kubota & Basol LLP

(57) ABSTRACT

A sidelink transmission and an uplink transmission that is carrying a sidelink hybrid automatic repeat request (HARQ) are both scheduled for transmission in a shared time window. If a priority associated with the sidelink HARQ is considered to be higher than a priority associated with the sidelink transmission, then a higher priority is assigned to the uplink transmission, regardless of whether the uplink transmission contains other uplink data. Otherwise, if the uplink transmission does not carry other uplink data, then
(Continued)

the higher priority is assigned to the sidelink transmission. Greater transmission resources are given to the transmission with the higher priority.

17 Claims, 9 Drawing Sheets

(51) Int. Cl.
*H04W 72/21* (2023.01)
*H04W 72/566* (2023.01)

(58) Field of Classification Search
CPC ... H04L 1/1671; H04L 1/1864; H04L 1/1854; H04L 1/1812
USPC .......................................................... 370/329
See application file for complete search history.

(56) References Cited

U.S. PATENT DOCUMENTS

2021/0211239 A1 7/2021 Fan et al.
2022/0394700 A1* 12/2022 Ko .................... H04W 56/0045
2024/0032055 A1 1/2024 Xiong et al.

FOREIGN PATENT DOCUMENTS

CN 111148064 A 5/2020
WO 2018/062969 A1 4/2018
WO 2020/032665 A1 2/2020
WO 2020/087465 A1 5/2020

OTHER PUBLICATIONS

CMCC: "Remaining issues on mode-1 resource allocation mechanism", 3GPP Draft; R1-2002205, 3rd Generation Partnership Project (3GPP), Mobile Competence Centre; vol. RAN WG1, No. e-Meeting; Apr. 20, 2020-Apr. 30, 2020 Apr. 11, 2020, XP052342282.
European Search Report and Search Opinion received for European Application No. 20935372.1, mailed on Dec. 20, 2023, 12 pages.
International Preliminary Report on Patentability received for PCT Patent Application No. PCT/CN2020/090183, mailed on Nov. 24, 2022, 6 pages.
International Search Report and Written Opinion received for PCT Patent Application No. PCT/CN2020/090183, mailed on Jan. 27, 2021, 7 pages.
Supplementary European Search Report and Search Opinion received for European Application No. 20935372.1, mailed on Mar. 13, 2024, 11 pages.
Apple, On Remaining Details of Physical Layer Procedures for Nr V2X Sidelink, 3GPP TSG RAN WG1 #100bis R1-2002327, Apr. 11, 2020, pp. 1-7.
Office Action received for Chinese Patent Application No. 202080100785.3, mailed on Sep. 26, 2024, 26 pages.

* cited by examiner

SIDELINK PHYSICAL LAYER PRIORITY BASED PROCEDURES

RELATED APPLICATIONS

The present application is the national phase of International Application No. PCT/CN2020/090183, filed on May 14, 2020 and the disclosure of which is hereby incorporated herein by reference in its entirety.

FIELD OF INVENTION

This invention relates generally to wireless technology and more particularly to sidelink physical layer procedures.

BACKGROUND OF THE INVENTION

Fifth generation mobile network (5G) is a wireless standard that aims to improve upon data transmission speed, reliability, availability, and more. This standard, while still developing, includes numerous details relating to various aspects of wireless communication, for example, device-to-device (sidelink) communication.

SUMMARY OF THE DESCRIPTION

Although some agreements have been made regarding communication protocol in a 5G environment, other issues remain open. For example, it is recognized in the present disclosure that for sidelink TBS calculation, a system (e.g., UE) may determine how the number of REs should be counted for PSSCH DMRS. Similarly, the system should sensibly prioritize for an uplink transmission containing sidelink HARQ and URLLC UCI. If uplink transmission for sidelink HARQ report to gNB has time overlap with URLLC UCI, then one of them is dropped since multiplexing is not supported. The determination as to which is dropped depends on the prioritization between uplink transmission for sidelink HARQ and URLLC UCI. Further, the system should determine how to prioritize UL transmission and SL transmission, when UL transmission is MsgA PUSCH or PUSCH with sidelink HARQ. Finally, the system should sensibly determine the lower bound on the number of simultaneous PSFCH transmissions.

Methods or apparatus are described that address the above issues, according to some embodiments. The methods include those described in the preceding figures, for example, FIG. 6-FIG. 9. The method can be performed by a device, e.g., user equipment (UE) in communication with other UE and/or a base station (e.g., gNB).

A method and apparatus of a device that determines a physical downlink shared channel scheduling resource for a user equipment device and a base station is described. In an exemplary embodiment, the device selects a plurality of component carriers from a pool of available component carriers associated with a wireless link established between the user equipment device and the base station. In addition, the device selects a virtual component carrier from the plurality of component carriers. Furthermore, the device determines a physical downlink shared channel scheduling resource based on at least the virtual component carrier.

In a further embodiment, a non-transitory machine-readable medium having executable instructions to cause one or more processing units to perform a method to determine a physical downlink shared channel scheduling resource for a user equipment device and a base station is described. In this embodiment, the method selects a plurality of component carriers from a pool of available component carriers associated with a wireless link established between the user equipment device and the base station. In addition, the method forms a virtual component channel from the plurality of component carriers. Furthermore, the method determines a physical downlink shared channel scheduling resource based on at least the virtual component carrier.

In some other embodiments, the pool of available component carriers includes at least one component carrier from a licensed band and at least one component carrier from an unlicensed band. The method, additionally, groups the pool of available component carriers into a plurality of groups of component carriers and selects one of the plurality of groups of component carriers as the plurality of component carriers. The method further selects the one of the plurality of groups of component carriers using a higher layer's signal.

In some embodiments, the method selects the one of the plurality of groups of component carriers is based on at least a Media Access Control (MAC) control element. In addition, the MAC control element can be identified by a MAC protocol data unit sub-header with a dedicated logical channel. The MAC control element can be either fixed size or multiple groups of data. In addition, the method can select the one of the plurality of groups of component carriers is based on at least a component carrier selection field that is transmitted to the user equipment device.

In a further embodiment, the method forms the virtual component carrier by aggregating bandwidth of the plurality of component carriers. The aggregating can use at least a frequency domain resource allocation field and the frequency domain resource allocation field is variably sized.

In some embodiments, a method to determine a physical downlink shared channel scheduling resource for a user equipment device and a base station is described. In some embodiments, the method selects a plurality of component carriers from a pool of available component carriers associated with a wireless link established between the user equipment device and the base station. In addition, the method forms a virtual component carrier from the plurality of component carriers. Furthermore, the method determines a physical downlink shared channel scheduling resource based on at least the virtual component carrier.

In some other embodiments, the pool of available component carriers includes at least one component carrier from a licensed band and at least one component carrier from an unlicensed band. The method, additionally, groups the pool of available component carriers into a plurality of groups of component carriers and selects one of the plurality of groups of component carriers as the plurality of component carriers. In a further embodiment, the method forms the virtual component carrier by aggregating bandwidth of the plurality of component carriers.

In some embodiments, a user equipment device that includes at least one antenna and one radio is described. The at least one radio is to perform cellular communications using a radio access technology that establishes a wireless link with a base station. The user equipment device further includes at least one or more processors are to select a plurality of component carriers from a pool of available component carriers associated with a wireless link established between the user equipment device and the base station, form a virtual component carrier from the plurality of component carriers, and determine a physical downlink shared channel scheduling resource based on at least the virtual component carrier. In addition, the pool of available component carriers includes at least one component carrier from a licensed band and at least one component carrier from an unlicensed band. Furthermore, the one or more processors select the plurality of component carriers by grouping the pool of available component carriers into a plurality of groups of component carriers and selecting one of the plurality of groups of component carriers as the plurality of component carriers.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that determines a physical downlink shared channel scheduling resource for a user equipment device and a base station is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a physical downlink shared channel scheduling resource for a user equipment device and a base station is described. In some embodiments, the device is a user equipment device that has a wireless link with a base station. In some embodiments, the wireless link is a fifth generation (5G) link. The device further groups and selects component carriers (CCs) from the wireless link and determines a virtual CC from the group of selected CCs. The device additionally can perform a physical downlink resource mapping based on an aggregate resource matching patterns of groups of CCs.

Figure 1:
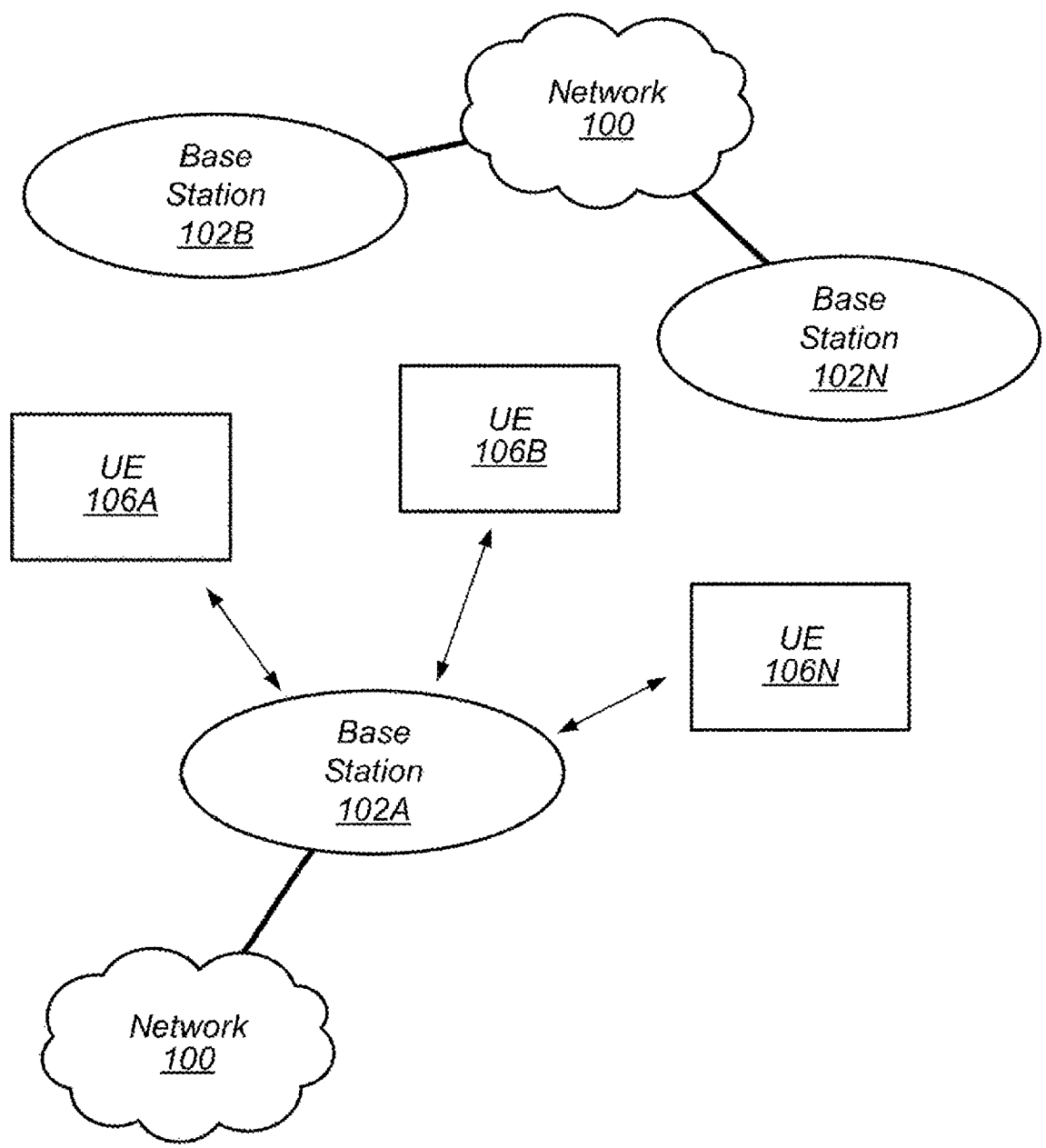
FIG. 1 illustrates an example wireless communication system according to some embodiments.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
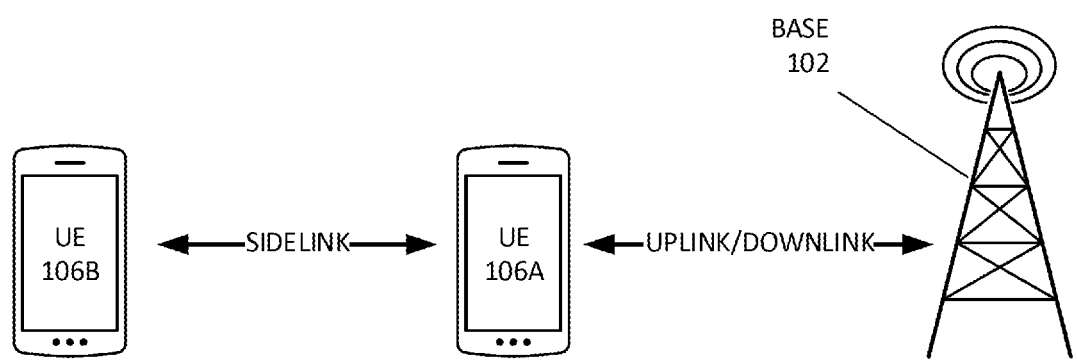
FIG. 2 illustrates uplink and sidelink communications according to some embodiments.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device.

Each of the UEs may include a processor that is configured to execute program instructions stored in memory. The UEs may perform any of the method embodiments described herein by executing such stored instructions. Alternatively, or in addition, the UEs may include a programmable hardware element such as an FPGA (field-programmable gate array) that is configured to perform any of the method embodiments described herein, or any portion of any of the method embodiments described herein.

The UEs may include one or more antennas for communicating using one or more wireless communication protocols or technologies. In some embodiments, the UEs may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UEs may include separate transmit and/or receive chains (e.g., including separate antennas and other radio components) for each wireless communication protocol with which it is configured to communicate. As a further possibility, the UE may include one or more radios which are shared between multiple wireless communication protocols, and one or more radios which are used exclusively by a single wireless communication protocol. For example, the UE might include a shared radio for communicating using either of LTE or 5G NR (or LTE or 1×RTT or LTE or GSM), and separate radios for communicating using each of Wi-Fi and Bluetooth. Other configurations are also possible.

Figure 3:
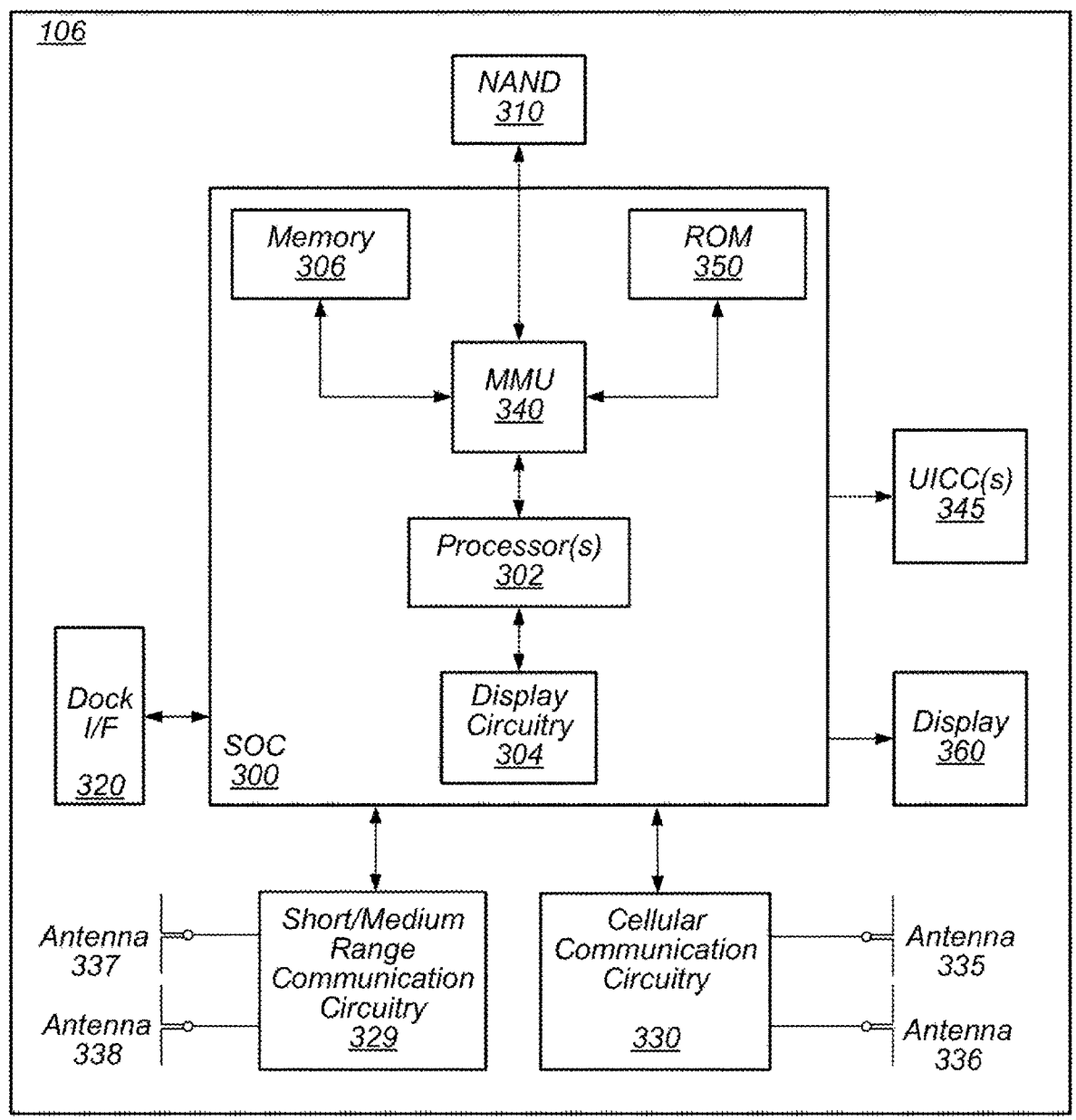
FIG. 3 illustrates an example block diagram of a UE according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
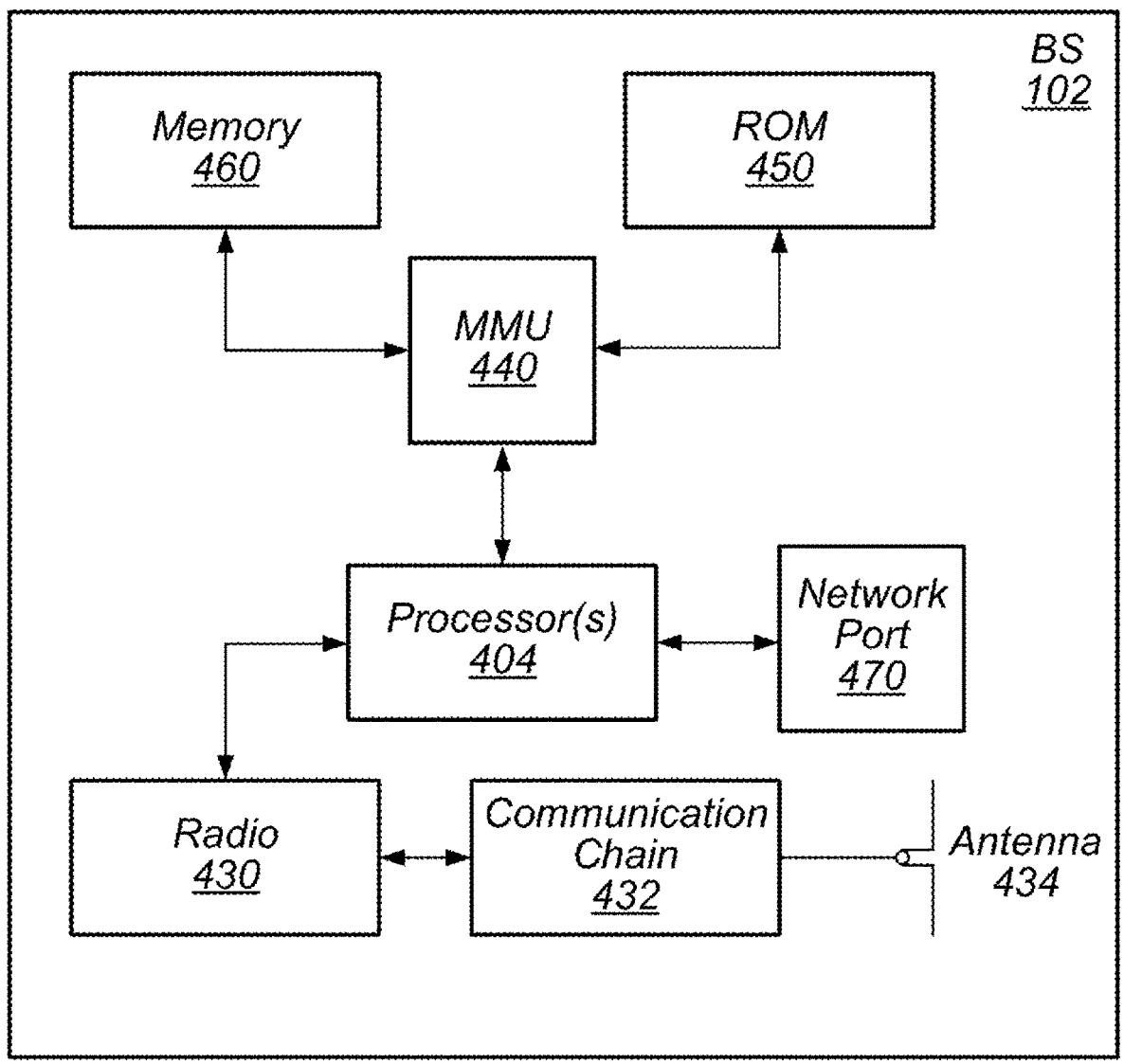
FIG. 4 illustrates an example block diagram of a BS according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or as a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
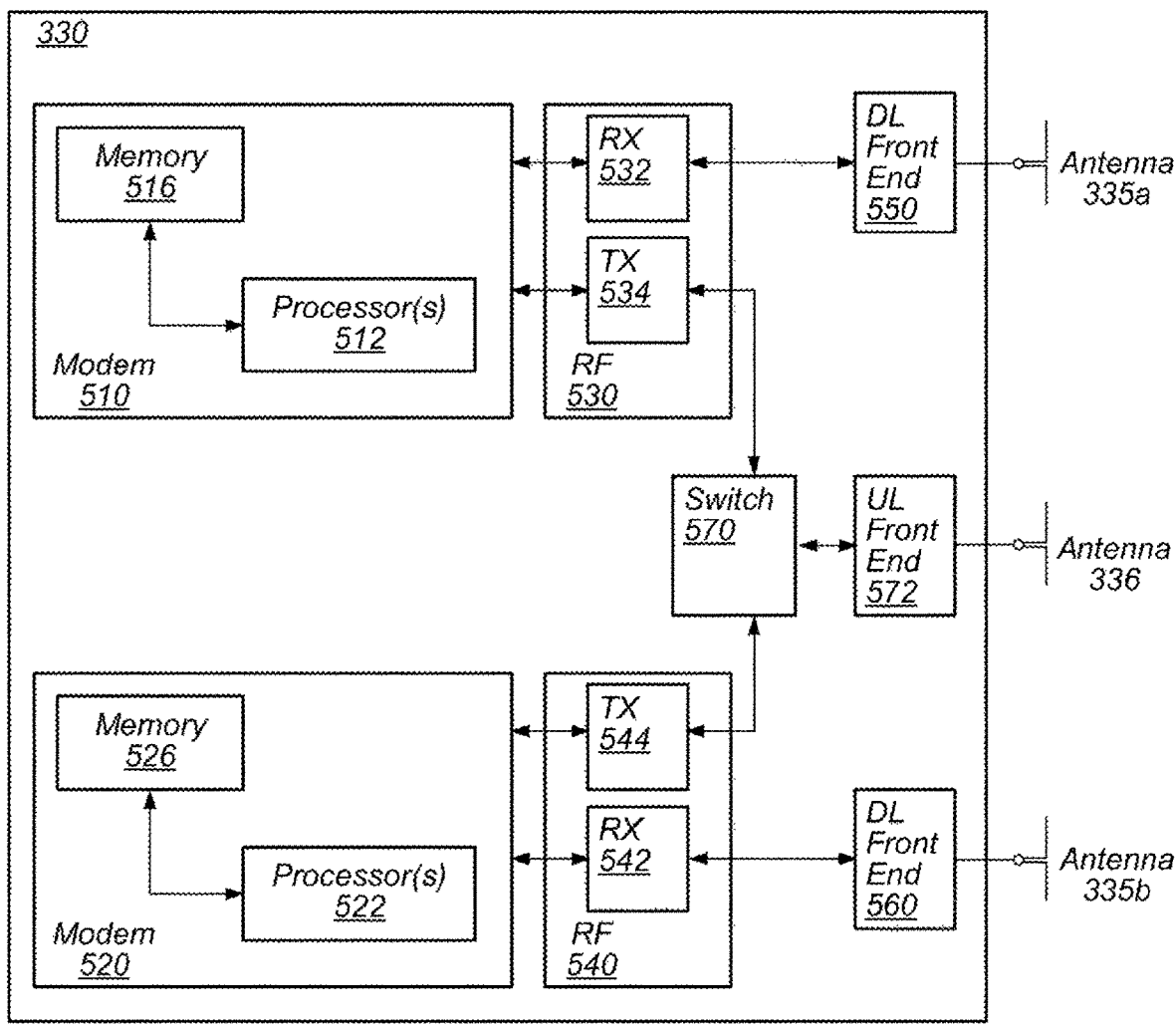
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for determining a physical downlink shared channel scheduling resource for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for determining a physical downlink shared channel scheduling resource for a user equipment device and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Transport block size (TBS) can be determined based on different factors, e.g., depending what messages will be in the payload. For $2^{nd}$ SCI overhead in TBS determination, the actual number of resource elements (RE) occupied by the $2^{nd}$ SCI is used. A two-stage SCI, having a first and second stage SCI is used in physical sidelink control channel (PSCCH) and in physical sidelink shared channel (PSSCH) design.

For overhead of physical sidelink feedback channel (PSFCH) in the TBS determination, the number of PSFCH symbols, indicated by SCI, can be used to determine the PSFCH overhead. For overhead of physical sidelink shared channel (PSSCH) demodulation reference signals (DMRS) in the TBS determination, the reference number of REs occupied by PSSCH DMRS can be used, where the reference number of REs is the average number of DMRS REs among (pre-)configured patterns. For channel state information reference signal (CSI-RS) and phase tracking reference signal (PT-RS) overheads in the TBS determination, a new higher layer parameter, e.g., sl-xOverhead, is introduced per resource pool.

In NR V2X Release 16, some communication protocol was agreed upon. For example, there will be no support of multiplexing of sidelink (SL) Hybrid Automatic Repeat Request (HARQ) and Uu uplink control information (UCI) on physical uplink control channel (PUCCH) or physical uplink shared channel (PUSCH). It is open, however, as to what a user equipment (UE) should do if the SL HARQ report to gNB has time overlap with Uu UCI.

For prioritization between sidelink transmission (SL TX), such as, for example, PSFCH or S-SSB (synchronization side band) and uplink transmission (UL TX), it is agreed that the priority of PSFCH TX is the highest priority of the associated PSCCH/PSSCH, and the priority of S-SSB is equal to the pre-configured priority introduced for in-device coexistence.

Further, in the case of when there is overlapping of UL TX other than with PUCCH carrying SL HARQ reporting, if the UL TX is associated with a DCI indicating "high" in "priority field" or configured with "high priority" by higher layers (i.e., URLLC case), then if an SL-threshold for ultra-reliable low-latency communication (URLLC) case is configured, LTE rule is used. The LTE rule dictates that UL TX is down-prioritized if the priority value of SL-TX is smaller than SL-threshold, otherwise prioritized. If an SL-threshold for URLLC is not configured, then UT TX is prioritized.

In the case of when there is overlapping of UL TX other than with PUCCH carrying SL HARQ reporting, and the UL TX is not associated with a DCI indicating "high" in "priority field" or configured with "high priority" by higher layers, then LTE rule is used with another SL-threshold configured for non-URLLC case.

Further, regardless of how UL TX overlaps with SL TX, physical random access channel (PRACH) and PUSCH scheduled by random access response (RAR) UL grant are always prioritized. When PUCCH carrying SL HARQ reporting overlaps with SL TX, then the message (either the PUCCH or ST TX) with a higher priority is transmitted. The priority of PUCCH carrying SL HARQ reporting is the highest priority of the associated PSFCH.

Further, it is agreed that when the UE supports up to $N_{max,PSFCH}$ (maximum number of simultaneous PSFCH occasions) in a PSFCH TX occasion and the UE has $N_{req,PSFCH}$ (required number of PSFCH occasions) to be transmitted in a given PSFCH TX occasion, then the UE will select N number of PSFCH occasions for actual transmission. The ascending order of priority in a PSFCH TX occasion is agreed upon for different situations.

In a first case, when $N_{req}<=N_{max,psfch}$ and is pre-configured, if the sum of the $N_{req}$ PSFCHs is smaller than or equal to that which is determined for the Nreq PSFCH transmissions, then N equals Nreq. In this first case, however, if the sum of Nreq PSFCHs is larger, N is determined based on UE implementation under the proposition that N>=X>=1.

In a second case, when $N_{req}>N_{max,psfch}$ and is pre-configured, the UE firstly selects $N_{max,psfch}$ PSFCHs based on ascending order of the priority of each PSFCH. If the sum of the $N_{max,psfch}$ PSFCHs is smaller than or equal to that which is determined for the $N_{max,psfch}$ PSFCH transmissions, then $N=N_{max,psfch}$. Otherwise, N is determined based on UE implementation under the proposition that N>=X>=1. Determination of X (down select) can be made in various manners. For example, X=max{1, the largest value which does not lead to the power limited case}, or X=1. Other alternatives for determining X are not precluded.

Figure 6:
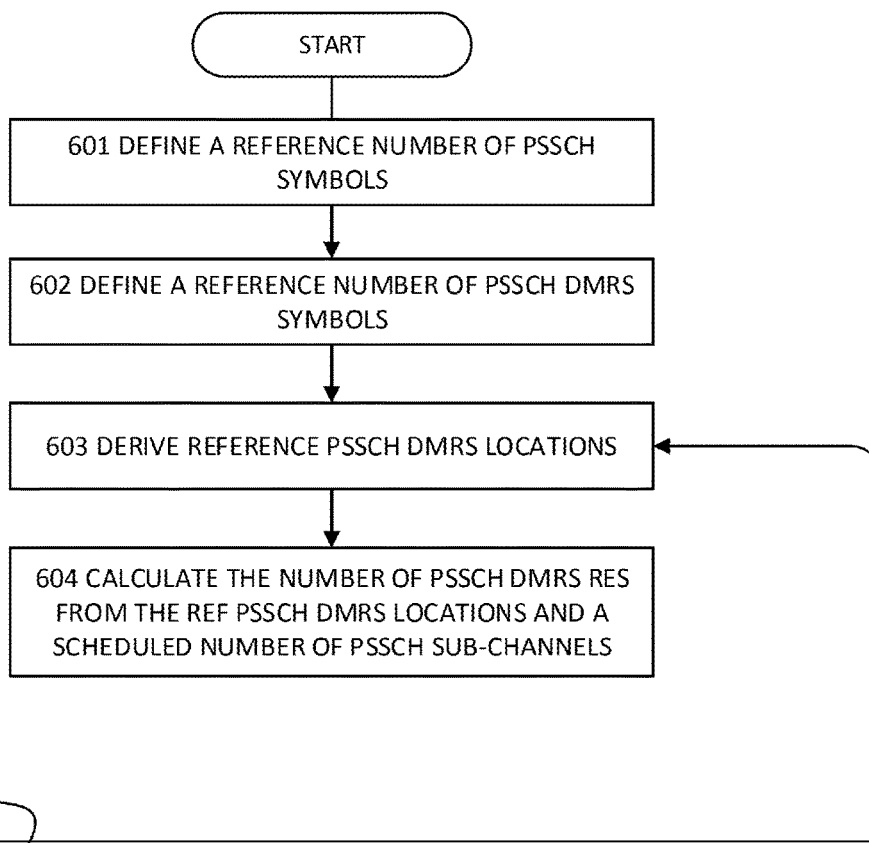
FIG. 6 illustrates an example process for determining transport block size according to some embodiments.

FIG. 6 shows a method 600 for calculating sidelink transport block size (TBS) based on PSSCH DMRS overhead, according to some embodiments. To establish or maintain sidelink communication, sidelink TBS should be determined, which creates a need to calculate overhead of PSSCH DMRS. TBS can be expressed as a number of resource elements REs.

Sidelink, as well understood, refers to device-to-device (UE to UE) communications. Sidelink, as specified for 5G, can operation in different modes. In Mode 1, the UEs are assisted by the eNB or gNB and they use dedicated radio resources for data transmission. In Mode 2, the UEs randomly select the radio resources from a resource pool that was previously configured by the eNB or gNB, or from a resource pool that was preconfigured. Both modes can share the same resource allocation structure, in which the transmission of data is scheduled within the physical sidelink control channel (PSCCH) period. The PSCCH contains the SCI, also known as scheduling assignment (SA), which can be used by the receiver to know the occupation of the PSSCH radio resources. In both modes, the SCI can be configured in both first stage SCI and second stage SCI. In NR V2X, the PSCCH and PSSCH are sent in the same slot.

As mentioned, some protocol features have been agreed upon. For example, PSSCH DMRS overhead used for determining TBS can be determined based on a number of REs occupied by PSSCH. There is a need, however, for determining how the REs for PSSCH DMRS is to be counted, which is addressed in FIG. 6.

At block 601, the method includes determining a number of PSSCH symbols. This number can be determined based on a total number of symbols included in the timeslot less a number of physical sidelink feedback channel (PSFCH) symbols. For example, the number of PSSCH symbols can be equal to a total number of sidelink symbols included in a timeslot (typically 14) known simply as a 'slot', less (subtracted by) the number of PSFCH symbols present in the timeslot, less 2, to account for 1 automatic gain control (AGC) symbol and 1 GAP symbol. This calculation assumes that PSSCH and PSFCH exclusively share a timeslot.

A symbol can be Orthogonal Frequency Division Multiplexing (OFDM) symbol. Five distinct OFDM numerologies are defined in 5G, to support radio operations in both FR1 and FR2 in Phase 1. In particular, the parameter SubcarrierSpacing index ($\mu$) can have five possible values in 5G Phase 1 as specified in 3GPP TS 38.211 [2]. Each value of $\mu$ maps to a specific subcarrier spacing value using the formula $2^{\mu}*15$ kHz. For example, the range of $\mu$ values 0 through 4, translates into inter-subcarrier spacing of 15, 30, 60, 120 and 240 kHz, respectively. In OFDM, useful symbol time Tu and subcarrier spacing $\Delta f$ are related by the equation: $Tu=1/\Delta f$. Since 5G NR defines five $\Delta f$ values (15, 30, 60, 120 and 240 kHz) in Phase 1, OFDM useful symbol times Tu's will be halved when $\Delta f$ value is doubled. In other words, the corresponding Tu values for the supported $\Delta f$ values in 5G NR are Tu, 0.5Tu, 0.25Tu, 0.125Tu, 0.0625Tu, where Tu=66.67 microseconds.

5G NR defines frame and slot structure to support the different Tu values, which differ from 4G LTE. 5G NR defines a frame to be 10 milliseconds (ms) in duration, like 4G LTE. Each frame is divided into 10 subframes of 1 ms each. The 1 ms subframe is then divided into one or more slots in 5G. The slot size is defined based on the Tu value. The number of OFDM symbols per slot is 14 for a configuration using normal cyclic prefix. For extended cyclic prefix, the number of OFDM symbols per slot is 12. In 5G NR, the slot can be viewed as the basis for scheduling, although different scheduling intervals are supported.

The number of PSFCH symbols can be pre-configured. Pre-configured means that parameters, values, or symbols are specified, such as, for example, they can be hard-coded or stored as a configurable setting in memory on a UE. These values can be accessed even without communication to the network. The pre-configured number of PSFCH symbols may only apply to PSFCH periodicity of 0 or 1 slots. For example, if periodicity is zero, then this means there are no occurrences, so all of a slot can be utilized by PSSCH. Similarly, if periodicity is 1, then some portion of every slot (less the GAP and AGC symbols) is utilized by PSFCH symbols. For example, the number of symbols used for PSFCH is 3, then the last 3 symbol indices (not including GAP) in every slot are taken by the PSFCH. Thus, if PSFCH periodicity is 2 or 4, an algorithm can be applied where pre-configured reference numbers are dynamically selected to determine a reference number of PSFCH symbols in the slot.

For example, the reference numbers can be selected from a set comprising values {0, 1, 2, 3}. The SCI can indicate one of the two pre-configured numbers with a bit. For example, a first reference number (selected from the set {0,1,2,3}) is '0' while a second reference number (also selected from the set) is '2'. If a bit in SCI has value '0', this can indicate that the first reference number '0' is used as the number of PSFCH symbols, but if the bit has value '1', this indicates that the second reference number '2' is used as the number of PSFCH symbols in the slot. This number of PSFCH symbols can be thought of as a proxy or 'reference' number used to determine the reference number of PSSCH symbols at block 601. The reference number of PSFCH symbols may or may not be equal to the actual number of PSFCH symbols in a sidelink transmission. The reference number of PSSCH symbols may or may not be equal to the actual number of PSSCH symbols in a sidelink transmission.

At block 602, the method includes determining a reference number of PSSCH demodulation reference signal (DMRS) symbols. Here, the reference number can be defined as the smallest, or an average, or a medium, or a mean of configured DMRS patterns. A DMRS pattern refers to a number and/or locations of PSSCH DMRS symbols per slot. The reference number of PSSCH DMRS symbols may or may not be equal to the actual number of PSSCH DMRS in a sidelink transmission.

At block 603, the method includes deriving the reference PSSCH DMRS locations. The locations here refer to a symbol index location in a slot. These locations can be derived by referencing a table 605 (e.g., existing table TS 38.211). For example, based on the existing table of TS 38.211, using the number of PSCCH symbols, the reference number of PSSCH symbols (determined at block 601) and the reference number of PSSCH DMRS symbols (determined at block 602), the DMRS time-domain locations in the slot can be extracted. This ensures initial transmission and retransmission have identical reference PSSCH DMRS locations.

For example, if the reference number of PSSCH symbols determined at block 601 is 8, this number can be mapped to the left column in table 605 labeled '$l_d$ in symbols'. In this example, assuming that the reference number of PSSCH DMRS symbols determined at block 602 is 2, then index locations of PSSCH DMRS symbols can be extracted based on cross-referencing the number of PSSCH symbols and the number of PSSCH DMRS symbols. In this case, the locations are 1 and 5 out of 14 locations in the slot.

At block 604, the method includes calculating the number of PSSCH DMRS resource elements (REs) from the reference PSSCH DMRS locations and scheduled number of PSSCH sub-channels. The scheduled number of PSSCH sub-channels varies depending on size of data. Transmission of a first data in PSSCH may use a first number of sub-channels in frequency domain and transmission of a second data in PSSCH may use a second number of sub-channels in frequency domain. The number of PSSCH DMRS REs per PSSCH DMRS symbol increases proportionally with the number of sub-channels used for PSSCH transmission. The total number of PSSCH DMRS REs is the summation of the number of PSSCH DMRS REs per PSSCH DMRS symbol (or location) over all the PSSCH DMRS symbols (or locations). Here, the number of PSSCH DMRS REs is calculated in two-dimensional system where PSSCH DMRS symbol (or location) represents the time-domain dimension and the number of PSSCH DMRS REs per PSSCH DMRS symbol represents the frequency-domain dimension.

The number of PSSCH DMRS REs can be used in the determination of the TBS. The TBS is the number of information bits of raw data. The calculation of TBS is linked to the number of REs used for (coded and modulated) data transmission. For example, to derive the number of REs used for data transmission, one can deduct from the total number of REs used for sidelink transmission, 1) the REs used for PSSCH DMRS, 2) the REs used for second SCI, 3) the REs used for PSFCH, and 4) the REs used for PT-RS, CSI-RS. The TBS calculation is performed at transmit UE and at receiver UE, separately. However, their calculation results should be the same. Instead of Tx UE notifying Rx UE the exact TBS values, the Tx UE may indicate some parameters in SCI to the Rx UE, so that Rx UE can calculate the TBS aligned with Tx UE's calculation.

In some embodiments, a number of REs of a second stage sidelink control information (SCI) can be calculated based on the PSSCH DMRS locations (e.g., determined at block 603), a payload size of a second stage SCI format, a scheduled target coding rate, a number of PSSCH layers, and a beta offset for the second stage SCI. The payload size of the second stage SCI format, the scheduled target coding rate, the number of PSSCH layers and the beta offset for the second stage SCI are unchanged between an initial transmission and a retransmission of the second stage SCI, to maintain the same number of REs from one transmission to another. The number of REs of a SCI can be given by the following:

$$N_{RE}^{SCI2} = \min\left\{\left\lceil\frac{(O_{SCI2}+L_{SCI2})\beta_{offset}^{SCI2}}{R*Q_m*v}\right\rceil, \left\lceil\alpha\sum_{l=0}^{N_{symbol}^{SCI-2}-1} M_{SC}^{SCI2}(l)\right\rceil\right\} + \gamma$$

As discussed, the following parameters in the above equation are unchanged between transmissions (e.g., an initial transmission and a retransmission). $O_{SCI2}$ is the payload size associated with a particular second stage SCI format (e.g., format A specifying X amount of bits, or format B specifying Y mount of bits). R is the scheduled target coding rate; $\beta_{offset}^{SCI2}$ is the beta offset for second stage SCI, and v (which also remains unchanged between transmissions) is the PSSCH transmission layer (or "Number of DMRS port").

$N_{symbol}^{SCI-2}$ is equal to the number of PSSCH symbols (e.g., determined at block 601). $M_{SC}^{SCI2}$ is a number of REs that can be used for second stage SCI, derived from the reference PSSCH DMRS locations (determined at block 603). For example, where PSSCH DMRS occurs, the number of REs for the second stage SCI can be reduced (e.g., by 50%) due to sharing the frequency resources with PSSCH DMRS. However, where there is no occurrence of the PSSCH DMRS, then the REs for that location in the slot will not be reduced.

$L_{SCI2}$ is a bit length (e.g., 24 bits to account for CRC). Given that the number of REs should be a multiple of 12 (because each resource block holds 12 REs), $\gamma$ is a value that, when added to the rest of the left side of the equation, gives a value that is a multiple of 12. $Q_m$ is a modulation order of second stage SCI, e.g., order of 2 for QPSK.

It should be understood that the values determined in blocks 601, 602 and 603 (e.g., the number of PSSCH symbols, number of PSSCH DMRS symbols, and PSSCH DMRS locations) can be proxy or reference numbers determined for other purposes, such as for example, calculating the number of PSSCH DMRS REs and the number of second stage SCI REs. In other words, the reference numbers can be used as proxy or estimate for decision making and determining values.

Figure 7:
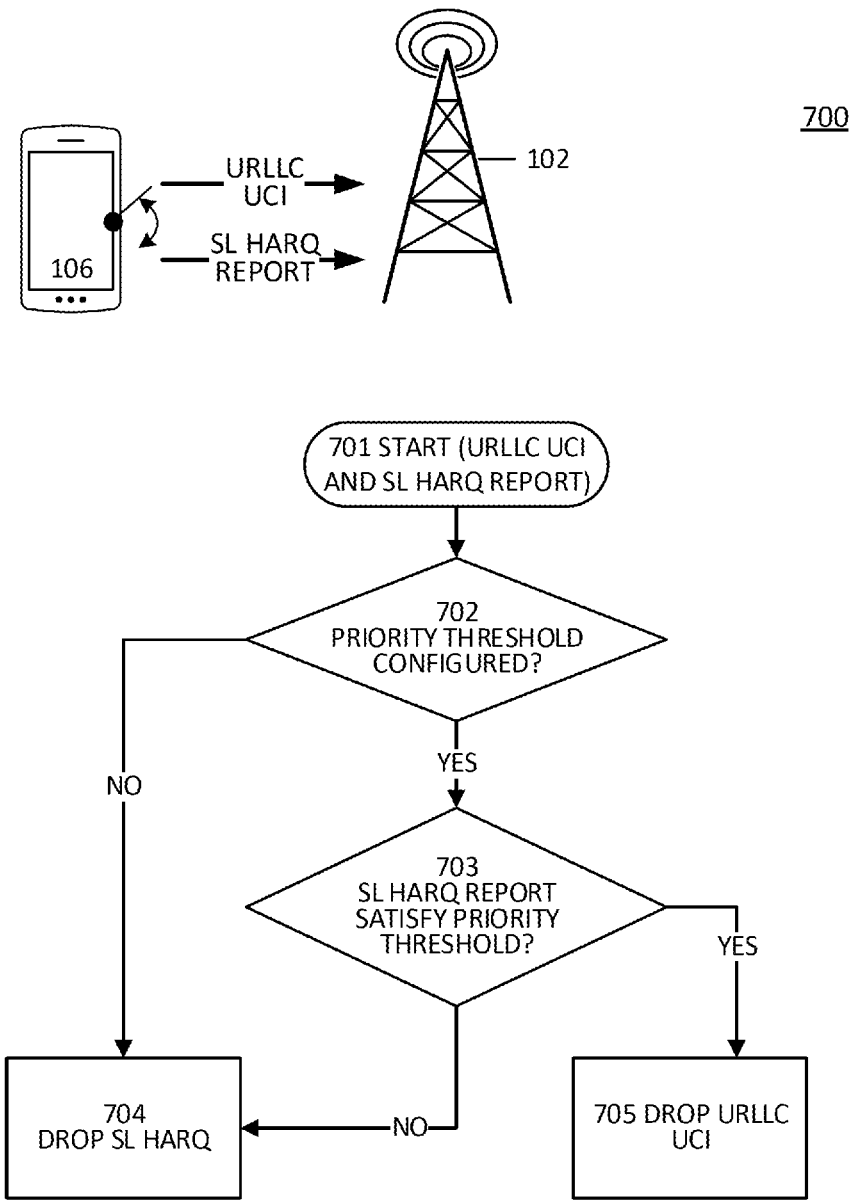
FIG. 7 illustrates an example prioritization of sidelink features in uplink transmission according to some embodiments.

FIG. 7 shows a method for prioritization of SL HARQ report, which addresses the problems when there is time overlap. Problems can occur when there is a time overlap between sidelink HARQ report to gNB and URLLC UCI in an uplink transmission, because the UE may not support multiplexing of these two messages. Thus, either the HARQ report to gNB or the URLLC UCI should be dropped. In this case, the UE should have a sensible manner to prioritize, the message with higher priority will be transmitted, while the message with lower priority will be dropped.

A UE 106 can prioritize between transmitting uplink URLLC UCI or SL HARQ report to base station 102. Prioritization depends on both URLLC UCI priority and sidelink HARQ report priority (as indicated in the corresponding SCI). At block 701, the process begins if both an ultra reliable low latency communication (URLLC) uplink control information (UCI) and a sidelink hybrid automatic repeat request (HARQ) report are to be transmitted over a shared uplink channel. The shared uplink channel can be, for example, a physical uplink control channel (PUCCH) or physical uplink shared channel (PUSCH).

This URLLC UCI transmission can include URLLC downlink HARQ-ACK, CSI report, or SR (scheduling request). The priority of the uplink transmission can be indicated by DCI format 1_1, 1_2 with "priority indicator" field equal to 1.

At block 702, if a priority threshold (e.g., "sl-PriorityThresholdULURLLC") is configured, then an LTE V2X prioritization rule is applied with the priority threshold and the method proceeds to block 703. At block 703, if the SL HARQ satisfies the configured priority threshold (e.g., the priority value corresponding to SL HARQ is smaller than the configured priority threshold), this indicates that SL HARQ report has a higher priority. In this case, the method proceeds to block 705 where then URLLC UCI is dropped. Otherwise, the method proceeds to block 704 where SL HARQ report is dropped (not included in the uplink transmission).

If at block 702, however, the priority threshold is not configured, then the method proceeds from block 702 to block 704 where SL HARQ report is dropped. In this case, URLLC UCI takes priority and is included in the uplink transmission, while the SL HARQ is not included.

Therefore, if a priority threshold is configured and a priority associated with the sidelink HARQ report satisfies the configured priority threshold (e.g., the priority associated with the sidelink HARQ report is smaller than the configured priority threshold), then the URLLC UCI is dropped. If, on the other hand, the priority threshold is configured and the priority associated with the sidelink HARQ report does not satisfy the configured priority threshold (e.g., the priority associated with the sidelink HARQ report is larger than or equal to the configured priority threshold), then dropping the sidelink HARQ report. In some embodiments, the same priority threshold is also used for prioritization between a URLLC uplink and sidelink transmission (e.g., physical sidelink feedback channel (PSFCH) or synchronization signal block (SSB or S-SSB), for example, as described with respect to FIG. 8, block 817.

Figure 8:
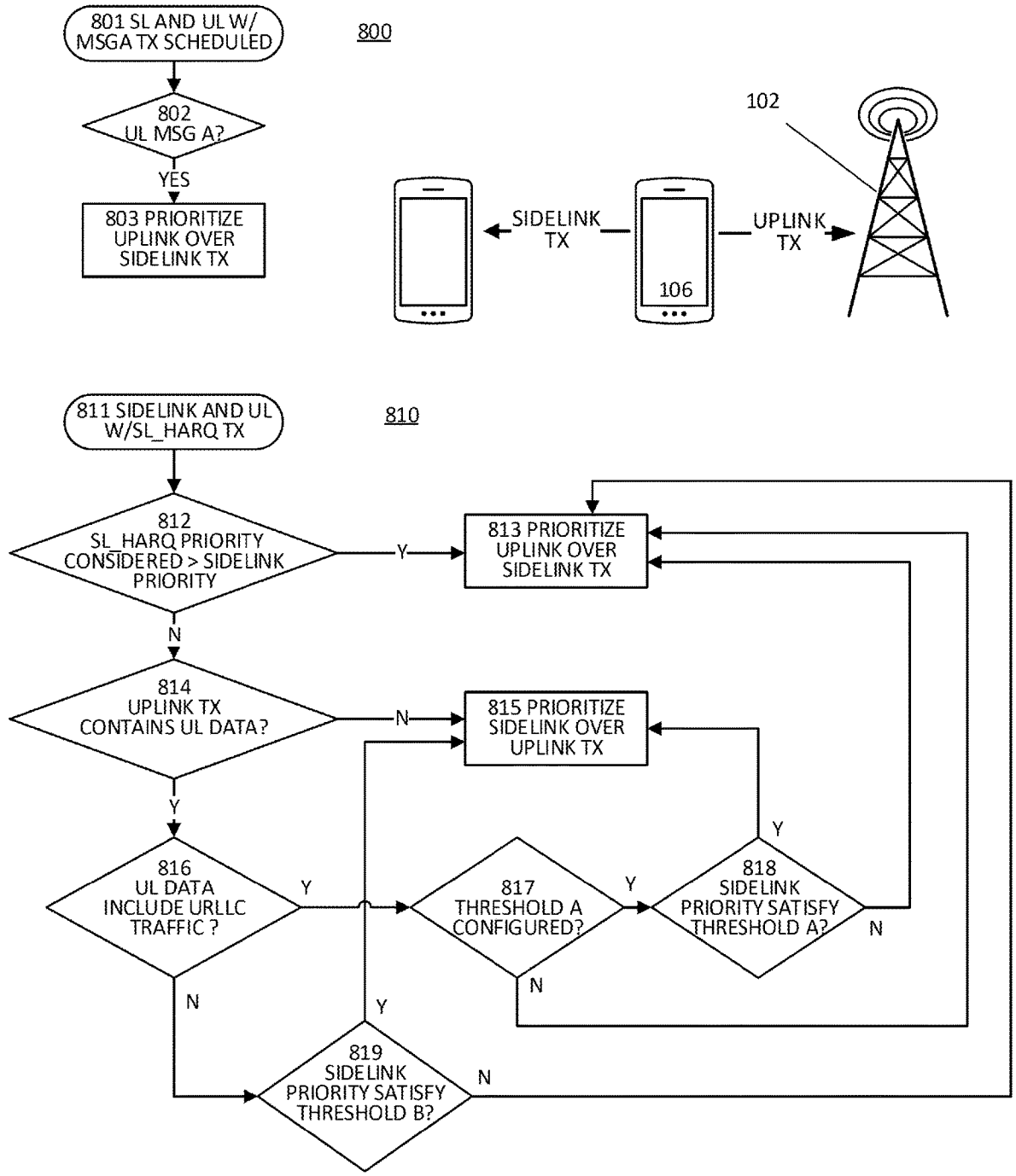
FIG. 8 illustrates an example prioritization of sidelink transmission and uplink transmission according to some embodiments.

FIG. 8 shows methods 800 and 810 for prioritization between a sidelink transmission and an uplink. In particular, method 800 shows prioritization between a sidelink transmission and an uplink transmission with MsgA (e.g., a MsgA PUSCH). MsgA is part of a two-step contention-based random access procedure. The UE sends a MsgA to gNB, and the gNB sends a MsgB response back to the UE. Method 810 shows prioritization between a sidelink transmission and an uplink that carries a sidelink hybrid automatic repeat request (HARQ). Unlike FIG. 7, the uplink and sidelink TX can share TX resources, for example, processing power, transmission bandwidth, etc., of the UE. The prioritized transmission (e.g., either uplink transmission or sidelink transmission) may use more processing power or more transmission power.

Referring to method 800, the method can begin at block 801, if both a MsgA uplink and a sidelink TX transmission are competing for resources, e.g., both scheduled for transmission in the shared time window. If it is determined, at block 802, that the uplink message carries MsgA, then the method can proceed to block 803 to prioritize the MsgA uplink over sidelink transmissions. The uplink MsgA can be a physical uplink shared channel (PUSCH) transmission. Sidelink transmissions can include PSFCH, PSSCH/PSCCH, SSB, or S-SSB transmissions. The uplink MsgA can be prioritized at both MAC layer and PHY layer. In some embodiments, the method 800 can be combined with other methods, for example, method 810.

Referring to method 810, this method describes prioritization between sidelink transmission and uplink transmission, similar to method 800. In this case, however, the uplink contains sidelink HARQ (e.g., a sidelink HARQ report, or other sidelink HARQ data), and optionally, other uplink data. In some aspects, the uplink transmission is a PUSCH transmission.

The method begins at block 811 if a sidelink transmission and an uplink transmission that is carrying a sidelink hybrid automatic repeat request (HARQ) are both competing for TX resources, e.g., they are scheduled for transmission in a shared time window. The method proceeds to block 812 where a condition is checked—if a priority associated with the sidelink HARQ is considered to be higher than a priority associated with the sidelink transmission, then the method proceeds to block 813 where it will assign a higher priority to the uplink transmission. The priorities associated with the sidelink HARQ, and the sidelink transmission can be provided in sidelink control information (SCI), and/or they can be specified through other means, for example, in configurable memory, settings, hardcoded, or provided in messages by the network or other UE, or a combination of those.

Otherwise (if the sidelink HARQ priority is lower than the sidelink transmission priority), then the method proceeds to block 814. At block 814, if the uplink transmission does not carry uplink data, then method proceeds to block 815 where the higher priority is assigned to the sidelink transmission. If, however, the uplink PUSCH transmission does carry uplink data, then the method proceeds to block 816 to check if the UL data includes URLLC traffic.

If, at block 816, URLLC traffic is included, the method proceeds to block 817. The method can check for URLLC traffic, for example, based on whether a "priority indicator" field in scheduling/grant downlink control information (DCI) is equal to 1. At block 817, if a threshold A is configured (specified, for example, in configurable memory, settings, hardcoded, or provided in messages by the network or other UE, or a combination of those) then the method proceeds to block 818 (LTE V2X prioritization rule is applied) where a check is performed as to whether the priority associated with the sidelink transmission satisfies the threshold A (e.g., "sl-PriorityThresholdULURLLC").

If the threshold is satisfied at block 818 (e.g., the priority value of sidelink transmission is smaller than the threshold A), then the method proceeds to block 815 to assign a higher priority to the sidelink transmission. If, however, threshold A is not satisfied (e.g., the priority value of sidelink transmission is larger than or equal to the threshold A), then the method can proceed to block 813 to prioritize the uplink transmission over the sidelink transmission. Further, referring back to block 817, if the threshold A is not configured, this could mean that a threshold was never configured for URLLC traffic, in which case, the method can default to block 813 and prioritize uplink transmission.

Referring back to block 816, if URLLC traffic is not included (but other UL DATA is still included in the uplink transmission), then the method can proceed to block 819 to check if the sidelink priority satisfies a threshold B (e.g., "sl-PriorityThreshold"). In such a manner, when the uplink data includes URLLC traffic, a priority threshold that is associated with the URLLC traffic (if configured) can be compared to the sidelink priority, but more generally, when URLLC traffic is not included, then a separate threshold can be applied to the sidelink priority.

The method 810 essentially checks if the sidelink HARQ contained in the uplink transmission has a higher priority than the sidelink transmission. If the answer is yes, then the uplink transmission is prioritized. If the answer is no, then other factors relating to other uplink data contained in the uplink transmission is checked against the sidelink transmission for priority.

It should be understood that, for the purpose of this disclosure, a priority can be 'considered to be higher' than another priority if it is greater than, or less than, the other priority, depending on the given convention. Similarly, when discussing 'satisfying' a threshold, this can mean that a value is greater than or less than a threshold, depending on an agreed upon convention. Various conventions can be used to determine priority based on comparison of different priorities to each other, or based on comparison with a threshold, without departing from the scope of the present disclosure.

Figure 9:
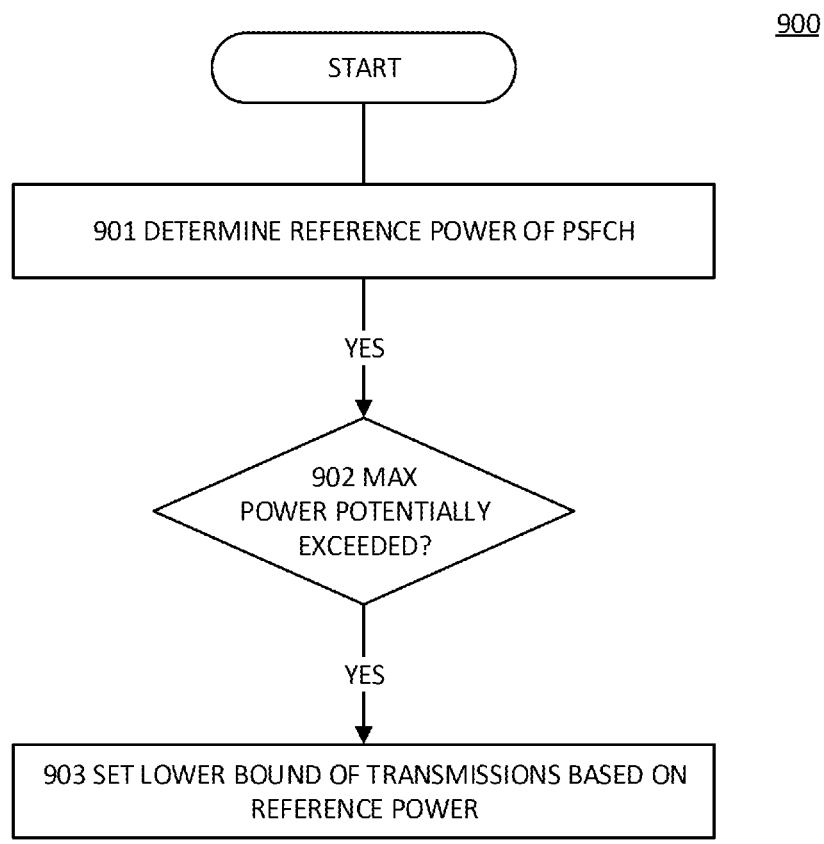
FIG. 9 illustrates an example determination of lower bound on transmissions according to some embodiments.

FIG. 9 shows a method for determining a lower bound on number of simultaneous PSFCH transmissions. At block 901, the method includes determining a reference power of PSFCH. The reference power can be determined by $P_{PSFCH}' = P_{O,PSFCH} + 10 \log_{10}(2^\mu) + \alpha_{PSFCH} \cdot PL$. As shown by the formula, in some aspects, the reference power is calculated as a sum of a) the nominal power of a PSFCH ($P_{O,PSFCH}$), b) $10 \log_{10}(2^u)$ where u is defined by subcarrier spacing, and c) $\alpha_{PSFCH} * PL$ where $\alpha_{PSFCH}$ is a path loss adaptation and PL is downlink path loss.

At operation 902, it is determined whether maximum transmission power ($P_{CMAX}$) of the transmitting UE is potentially exceeded. For example, this can be determined based on if $P_{PSFCH}' + 10 \log_{10}(\min\{N_{sch,TX}, N_{max,PSFCH}\}) > P_{CMAX}$. Here, the number of simultaneous PSFCH transmissions is given by N≥X, where X is the lower bound. $N_{sch,TX}$ represents the number of scheduled transmissions and $M_{max,PSFCH}$ represents a maximum number of PSFCH transmissions. The power of each PSFCH transmission can be determined by $P_{PSFCH} = \min(P_{CMAX} - 10 \log_{10}(N), P_{PSFCH}')$.

At operation 903, in response to a number of simultaneous PSFCH transmissions exceeding a maximum transmission power of a user equipment (e.g., in a single PSFCH occasion), a lower bound of the number of simultaneous PSFCH transmissions can be determined based on the maximum transmission power of the user equipment (UE) and a reference power (e.g., $P_{PSFCH}'$) of a PSFCH transmission determined based on a nominal power of a PSFCH. The reference power $P_{PSFCH}'$ can represent an upper bound of each PSFCH transmission power, and can be used to derive how many simultaneous PSFCH transmissions can potentially be made in addition to that specified by $P_{CMAX}$.

In some aspects, the lower bound is determined as a larger of a) one, or b) a floor or a ceiling of: ten to the power of a difference between the maximum transmission power of the UE and the reference power divided by ten. For example, lower bound X with floor can be determined based on $$X = \max\left(1, \left\lfloor 10^{\frac{P_{CMAX} - P'_{PSFCH}}{10}} \right\rfloor\right).$$

Alternatively, lower bound X with ceiling can be determined based on $$X = \max\left(1, \left\lceil 10^{\frac{P_{CMAX} - P'_{PSFCH}}{10}} \right\rceil\right).$$

The former is the more conservative approach while the latter is the more aggressive approach and more closely approaches a maximum power capability of the UE.

The UE can include, in a transmission, simultaneous PSFCH transmissions at least as many as the lower bound of the number of simultaneous PSFCH transmissions, but not exceeding the maximum transmission power of the user equipment (UE). For example, if the lower bound is 8 and the maximum number of PSFCH transmissions is 20, then the UE will transmit at least 8 simultaneous PSFCH transmissions, but not more than 20.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method, performed by one or more processors of a user equipment (UE), comprising:
   when both an ultra reliable low latency communication (URLLC) uplink control information (UCI) and a sidelink hybrid automatic repeat request (HARQ) report are to be transmitted in an uplink transmission over an uplink channel, then,
   in response to a priority threshold being configured, and a priority associated with the sidelink HARQ report satisfying the priority threshold, dropping the URLLC UCI;
   in response to the priority threshold being configured, and the priority associated with the sidelink HARQ report not satisfying the priority threshold, dropping the sidelink HARQ report; and
   in response to the priority threshold not being configured, dropping the sidelink HARQ report.

2. The method of claim 1, wherein the uplink channel is a physical uplink control channel (PUCCH) or physical uplink shared channel (PUSCH).

3. The method of claim 1, wherein the priority threshold is also used for prioritization between a) URLLC uplink and b) physical sidelink feedback channel (PSFCH) or synchronization signal block (SSB).

4. The method of claim 1, wherein a URLLC downlink HARQ-ACK is included in the uplink transmission.

5. The method of claim 1, wherein a channel state information (CSI)-report is included in the uplink transmission.

6. The method of claim 1, wherein a scheduling report (SR) is included in the uplink transmission.

7. A user equipment device comprising:
   at least one antenna;
   at least one radio, wherein the at least one radio is to perform cellular communications using a radio access technology that establishes a wireless link with a serving cell; and
   one or more processors, configured to perform operations that include:
   when both an ultra reliable low latency communication (URLLC) uplink control information (UCI) and a sidelink hybrid automatic repeat request (HARQ) report are to be transmitted in an uplink transmission over an uplink channel, then,
   in response to a priority threshold being configured, and a priority associated with the sidelink HARQ report satisfying the priority threshold, dropping the URLLC UCI;
   in response to the priority threshold being configured, and the priority associated with the sidelink HARQ report not satisfying the priority threshold, dropping the sidelink HARQ report; and
   in response to the priority threshold not being configured, dropping the sidelink HARQ report.

8. The user equipment device of claim 7, wherein the uplink channel is a physical uplink control channel (PUCCH) or physical uplink shared channel (PUSCH).

9. The user equipment device of claim 7, wherein the priority threshold is also used for prioritization between a) URLLC uplink and b) physical sidelink feedback channel (PSFCH) or synchronization signal block (SSB).

10. The user equipment device of claim 7, wherein a URLLC downlink HARQ-ACK is included in the uplink transmission.

11. The user equipment device of claim 7, wherein a channel state information (CSI)-report is included in the uplink transmission.

12. The user equipment device of claim 7, wherein a scheduling report (SR) is included in the uplink transmission.

13. A baseband processor of a user equipment (UE) configured to cause the UE to perform operations comprising:
   when both an ultra reliable low latency communication (URLLC) uplink control information (UCI) and a sidelink hybrid automatic repeat request (HARQ) report are to be transmitted in an uplink transmission over an uplink channel, then,
   in response to a priority threshold being configured, and a priority associated with the sidelink HARQ report satisfying the priority threshold, dropping the URLLC UCI;

in response to the priority threshold being configured, and the priority associated with the sidelink HARQ report not satisfying the priority threshold, dropping the sidelink HARQ report; and in response to the priority threshold not being configured, dropping the sidelink HARQ report.

14. The baseband processor of claim 13, wherein the uplink channel is a physical uplink control channel (PUCCH) or physical uplink shared channel (PUSCH).

15. The baseband processor of claim 13, wherein the priority threshold is also used for prioritization between a) URLLC uplink and b) physical sidelink feedback channel (PSFCH) or synchronization signal block (SSB).

16. The baseband processor of claim 13, wherein a URLLC downlink HARQ-ACK is included in the uplink transmission.

17. The baseband processor of claim 13, wherein a channel state information (CSI)-report is included in the uplink transmission.

* * * * *